United States Patent
Hecht

(10) Patent No.: US 9,656,325 B2
(45) Date of Patent: May 23, 2017

(54) INDEXABLE CUTTING INSERT AND CUTTING TOOL THEREFOR

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 14/868,810

(22) Filed: Sep. 29, 2015

(65) Prior Publication Data

US 2016/0016234 A1    Jan. 21, 2016

Related U.S. Application Data

(63) Continuation of application No. 13/452,606, filed on Apr. 20, 2012, now Pat. No. 9,174,279.

(Continued)

(51) Int. Cl.
  *B23B 27/16* (2006.01)
  *B23B 27/04* (2006.01)
  *B23B 29/04* (2006.01)

(52) U.S. Cl.
  CPC ........ *B23B 27/1622* (2013.01); *B23B 27/045* (2013.01); *B23B 27/1614* (2013.01); *B23B 29/043* (2013.01); *B23B 2200/048* (2013.01); *B23B 2200/0457* (2013.01); *B23B 2200/121* (2013.01); *B23B 2200/369* (2013.01); *B23B 2200/3627* (2013.01); *B23B 2205/10* (2013.01);
  (Continued)

(58) Field of Classification Search
  CPC .............. B23B 29/043; B23B 27/1614; B23B 2200/048; B23B 2200/369; B23B 2200/3627; B22B 27/045; B22B 27/1622; B22B 2260/104

USPC .................................................. 407/113, 117
  See application file for complete search history.

(56) References Cited

U.S. PATENT DOCUMENTS 318,687 A    5/1885  Billings
2,657,720 A  11/1953 Wolfe
(Continued)

FOREIGN PATENT DOCUMENTS

DE    7629302 U1   1/1977
DE    202641 A1    9/1983
(Continued)

OTHER PUBLICATIONS

Search Report dated Mar. 21, 2013 issued in PCT counterpart application (No. PCT/IL2012/050463).

(Continued)

*Primary Examiner* — Sara Addisu
(74) *Attorney, Agent, or Firm* — Womble Carlyle

(57) ABSTRACT

A cutting tool assembly includes a cutting tool and an indexable cutting insert having an insert index axis. The cutting insert includes parallel insert first and second sides connected by an insert peripheral surface that extends peripherally around the cutting insert. At least one clamping hole opens out to one or both of the insert first and second sides, and at least a portion of the clamping hole is in a clamping region of the cutting insert. The insert peripheral surface includes cutting edges that are spaced-apart and extend from the insert first side to the insert second side. Along a width direction, which is perpendicular to the insert first and second sides, each of the cutting edges is wider than the cutting insert, at least at the cutting region of the cutting insert.

21 Claims, 9 Drawing Sheets

Related U.S. Application Data

(60) Provisional application No. 61/570,369, filed on Dec. 14, 2011.

(52) U.S. Cl.
CPC ... *B23B 2260/104* (2013.01); *Y10T 29/49959* (2015.01); *Y10T 407/2274* (2015.01); *Y10T 407/2282* (2015.01); *Y10T 407/23* (2015.01)

(56) References Cited

U.S. PATENT DOCUMENTS

| | | | |
|---|---|---|---|
| 2,836,240 A | | 5/1958 | Nuding |
| 3,228,438 A | | 1/1966 | Serry |
| 3,551,977 A | | 1/1971 | Novkov |
| 3,760,474 A | * | 9/1973 | Stein ............... B23B 27/08 407/117 |
| 4,035,889 A | | 7/1977 | McCreery |
| 4,844,677 A | | 7/1989 | Schwartzman |
| 5,004,379 A | | 4/1991 | Little |
| 5,222,843 A | | 6/1993 | Katbi et al. |
| 5,308,197 A | * | 5/1994 | Little ............... B23B 27/065 407/101 |
| 5,702,210 A | | 12/1997 | Boianjiu |
| 6,543,970 B1 | | 4/2003 | Qvarth et al. |
| 6,942,434 B2 | | 9/2005 | Friedman et al. |
| 7,597,508 B2 | | 10/2009 | Hecht |
| 7,972,090 B2 | | 7/2011 | Jonsson et al. |
| 8,678,718 B2 | | 3/2014 | Hecht |
| 8,714,886 B2 | | 5/2014 | Hecht et al. |
| 8,858,130 B2 | * | 10/2014 | Morrison ............... B23C 5/06 407/113 |
| 2003/0156910 A1 | | 8/2003 | Friedman et al. |
| 2008/0232912 A1 | * | 9/2008 | Bhagath ............... B23C 5/06 407/114 |
| 2009/0162154 A1 | * | 6/2009 | Jonsson ............... B23B 27/045 407/114 |
| 2013/0309027 A1 | | 11/2013 | Christyakov |

FOREIGN PATENT DOCUMENTS

| | | |
|---|---|---|
| DE | 29908767 U1 | 11/1999 |
| EP | 0575901 A1 | 12/1993 |
| FR | 2041377 | 1/1971 |
| FR | 2041377 A5 | 1/1971 |
| GB | 1 567 004 | 5/1980 |
| JP | S 40-12670 B | 3/1963 |
| SU | 543465 | 4/1977 |
| SU | 764855 | 9/1980 |
| SU | 764855 A1 | 9/1980 |
| WO | WO 2012/118009 | 9/2012 |

OTHER PUBLICATIONS

Japanese Office Action with dated Oct. 19, 2016, issued in Japanese counterpart application (No. 2014-546727).

Russian Office Action dated Oct. 5, 2016, issued in Russian counterpart application (No. 2014128615).

\* cited by examiner

INDEXABLE CUTTING INSERT AND CUTTING TOOL THEREFOR

RELATED APPLICATIONS

This is a Continuation of U.S. patent application Ser. No. 13/452,606, filed 20 Apr. 2012, now U.S. Pat. No. 9,174,279, which claims priority to U.S. Provisional Patent Application No. 61/570,369, filed 14 Dec. 2011. The contents of the aforementioned applications are incorporated by reference in their entirety.

FIELD OF THE INVENTION

The subject matter of the present application relates to indexable cutting inserts and cutting tools configured for holding such cutting inserts, both which are designed for metalworking operations involving chip removal. In particular the subject matter of the present application relates to indexable cutting inserts comprising opposing first and second insert sides which are connected by an insert peripheral surface that extends peripherally around the cutting insert and which comprises spaced-apart cutting edges.

BACKGROUND OF THE INVENTION

Indexable cutting inserts of the type described above can be used for cutting, for example, rectangular shapes from metal workpieces, which shape may be desired, for example in grooving and parting operations.

Indexable inserts of the type described above are configured with a plurality of edges that are designed to be used successively as opposed to concurrently. To elaborate, after an operative edge is, for example, worn or broken, a successive edge can be selected to become an operative edge. This can be achieved, for example, by releasing the insert from a tool body, indexing the indexable insert about an insert index axis, and securing the insert to the tool body with the successive, hitherto different and unused edge, presented as a new operative edge.

An example of a known cutting insert having such construction is disclosed in U.S. Pat. No. 6,942,434.

SUMMARY OF THE INVENTION

In accordance with a first aspect of the subject matter of the present application, there is provided an indexable cutting insert comprising at least one clamping hole which comprises at least a clamping hole portion located in an associated insert clamping region which is defined outside of an associated cutting region of the cutting insert.

A possible advantage of such construction can be a cutting depth extending to the associated cutting region.

More precisely, there is provided an indexable cutting insert having an insert index axis and comprising parallel insert first and second sides connected by an insert peripheral surface which extends peripherally around the cutting insert, and at least one clamping hole opening out to one or both of the insert first and second sides; the insert peripheral surface comprising cutting edges which are spaced-apart and extend from the insert first side to the insert second side; wherein each three consecutively positioned cutting edges constitute an associated cutting arrangement comprising a central cutting edge disposed between two peripheral cutting edges, the central cutting edge being wider, along a width direction which is perpendicular to the insert first and second sides, than any other portion of an associated insert cutting region defined from the central cutting edge to at least an imaginary straight line connecting the two peripheral cutting edges; and at least a clamping hole portion of the at least one clamping hole is located in an associated insert clamping region which is defined outside of the associated cutting region.

In accordance with a second aspect of the subject matter of the present application, there is provided a cutting tool comprising a tool head, and a clamping mechanism configured for securing a cutting insert to an insert pocket of the tool head; the insert pocket comprising a pocket seating surface, at least one pocket wall extending transversely from the pocket seating surface and defining a pocket rear boundary, and a pocket front edge located on an opposing side of the pocket seating surface from the pocket rear boundary and extending along a front boundary of the cutting tool; wherein, in a view perpendicular to the pocket seating surface, the tool head and clamping mechanism do not extend past an imaginary inscribed arc extending along the front boundary.

In accordance with still another aspect of the subject matter of the present application, there is provided a cutting tool assembly comprising, in combination, a cutting insert having any of the features of the first aspect and/or features described below, and a cutting tool having any of the features of the second aspect and/or features described below.

In accordance with a further aspect of the subject matter of the present application, there is provided a method of clamping a cutting insert to a cutting tool having any of the features of the second aspect, the cutting insert comprising parallel insert first and second sides connected by an insert peripheral surface which extends peripherally around the cutting insert, and at least one clamping hole opening out to both of the insert first and second sides; the method comprising:

a. mounting the cutting insert to the clamp by extending a clamp body portion of the clamp completely through a clamping hole portion of the at least one clamping hole while leaving a remainder of the at least one clamping hole unoccupied; and b. fastening at least one clamp to the cutting tool head to thereby bias the clamp head portion of the at least one clamp against the cutting insert and secure the cutting insert to the insert pocket.

In accordance with another aspect of the subject matter of the present application, there is provided a method of manufacturing an insert, comprising the step of grinding side seating surfaces thereof whilst maintaining distance from cutting edges thereof.

In accordance with still another aspect of the subject matter of the present application, there is provided an insert produced by the process described in the previous aspect.

It is understood that the above-said is a summary, and that any of the aspects above may further comprise any of the features described in connection with any of the other aspects or described hereinbelow. For example, the following features may be applicable to any of the aspects above:

A. In a plan view of at least one of the insert first and second sides, the associated insert cutting region can extend to an imaginary arc inscribed within the two peripheral cutting edges and opening in an outward direction from the insert index axis towards the central cutting edge, the insert index axis being interposed between the arc and the central cutting edge. This can permit the cutting insert to provide a depth of cut which extends to at least the insert index axis.

B. The arc can have a curvature corresponding to a curvature of an imaginary circle along which the cutting edges lie.
C. The first and second side surfaces can be major surfaces, i.e. of much greater area than the insert peripheral surface.
D. The at least one clamping hole can be a through-hole which opens out to both of the insert first and second sides. Alternatively, the at least one clamping hole can be a blind-hole. The at least one clamping hole can be a plurality of clamping holes. An entirety of at least one of the plurality of clamping holes can be located in the clamping region.
E. Each of the cutting edges can be wider along the width direction than any other portion of the cutting insert. The cutting insert can comprise exactly five cutting edges.
F. The cutting insert can comprise a disc-shaped body portion and cutting portions, each of the cutting portions extending from a periphery of the body portion and comprising one of the cutting edges. Each of the cutting portions can comprise a reinforced portion and an intermediate portion extending from the reinforced portion to the body portion. The reinforced portion can be wider along the width direction than the intermediate portion.
G. The cutting insert can gradually decrease in width, along the width direction, from each of the cutting edges to a portion (such as an intermediate or body portion) of the cutting insert which is closer to the insert index axis than to the cutting edges.
H. The insert peripheral surface can further comprise a plurality of peripheral seating surfaces. Each of the peripheral seating surfaces can extend along a straight path from a first insert cutting portion to a second insert cutting portion, the distance of each of the peripheral seating surfaces to the insert index axis varying along different points of the path thereof. Each of the peripheral seating surfaces can be flat.
I. The cutting insert can further comprise at least one side seating surface. Each side seating surface can be outwardly-spaced from at least one of the insert first and second sides. The at least one side seating surface can comprise a plurality of side seating surfaces on one of at least one of the insert first and second sides. The plurality of side seating surfaces can further comprise pairs of side seating surfaces, wherein one side seating surface of each pair is located on opposing sides of the at least one of the insert first and second sides. At least three of the side seating surfaces on one of the insert first and second sides can each be located in the clamping region of the cutting insert.
J. In a plan view of one of the insert first and second sides, the cutting insert can have rotational symmetry for a degree of rotation fulfilling the condition: (360°/[total number of the cutting edges]).
K. The cutting insert can be symmetrical about an imaginary insert plane which bisects the peripheral surface and is parallel to the insert first and second sides.
L. The clamping mechanism can comprise a clamp comprising a clamp body portion configured to be secured to the tool head at the front boundary, and a clamp head portion configured to apply a force in a direction towards the pocket seating surface.
M. The clamp head portion can be configured to apply a force in a direction towards the at least one pocket wall.
N. In an end view of the clamp, a front surface of the clamp can have a convex shape, a rear surface of the clamp can have a concave shape, and the clamp can have a crescent-shape.
O. The clamp can further comprise a guard portion extending in a direction away from the clamp's head portion. The guard portion can be in the form of a semi-circle or portion of a circle. The guard portion can be shaped to be thinner than cutting edges of a cutting insert to which the clamp is to be connected.
P. At least one side seating surface of the cutting insert and pocket seating surface can be configured for mutual engagement, and at least one insert peripheral seating surface and at least one pocket wall can be configured for mutual engagement, for providing stabilized mounting of the cutting insert to the cutting tool.
Q. The at least one clamping hole can be a plurality of spaced-apart clamping holes and the at least one clamp can be a plurality of clamps, wherein the step of fastening comprises fastening the plurality of clamps. The step of fastening can comprise fastening exactly three clamps.
R. The at least one clamping hole can have portions located in both an associated insert clamping region and an associated cutting region.

BRIEF DESCRIPTION OF THE DRAWINGS

For a better understanding of the subject matter of the present application, and to show how the same may be carried out in practice, reference will now be made to the accompanying drawings, in which.

Figure 1A:
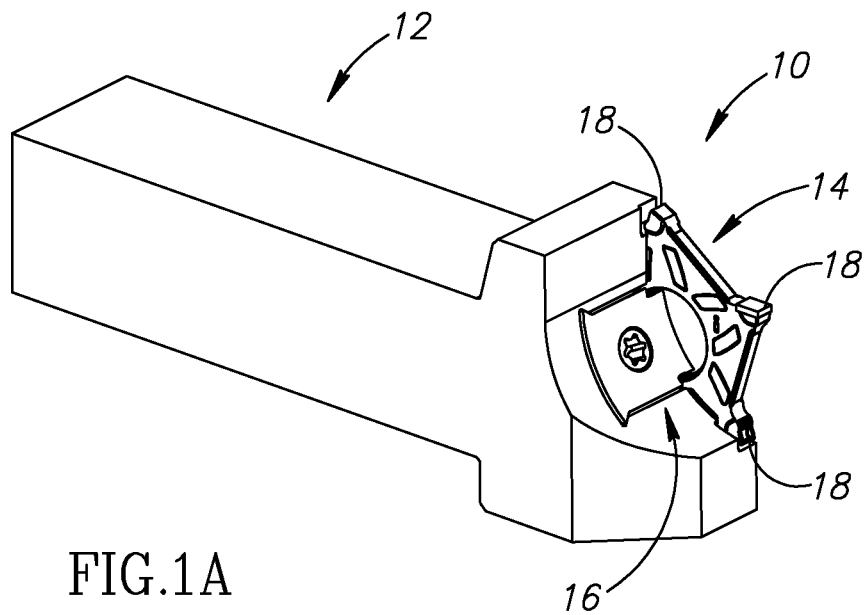
FIG. 1A is a perspective view of a cutting tool assembly.

Reference numerals repeated among the figures and/or shifted by a value of 100 for different embodiments, indicate corresponding or analogous elements.

DETAILED DESCRIPTION

Figure 1B:
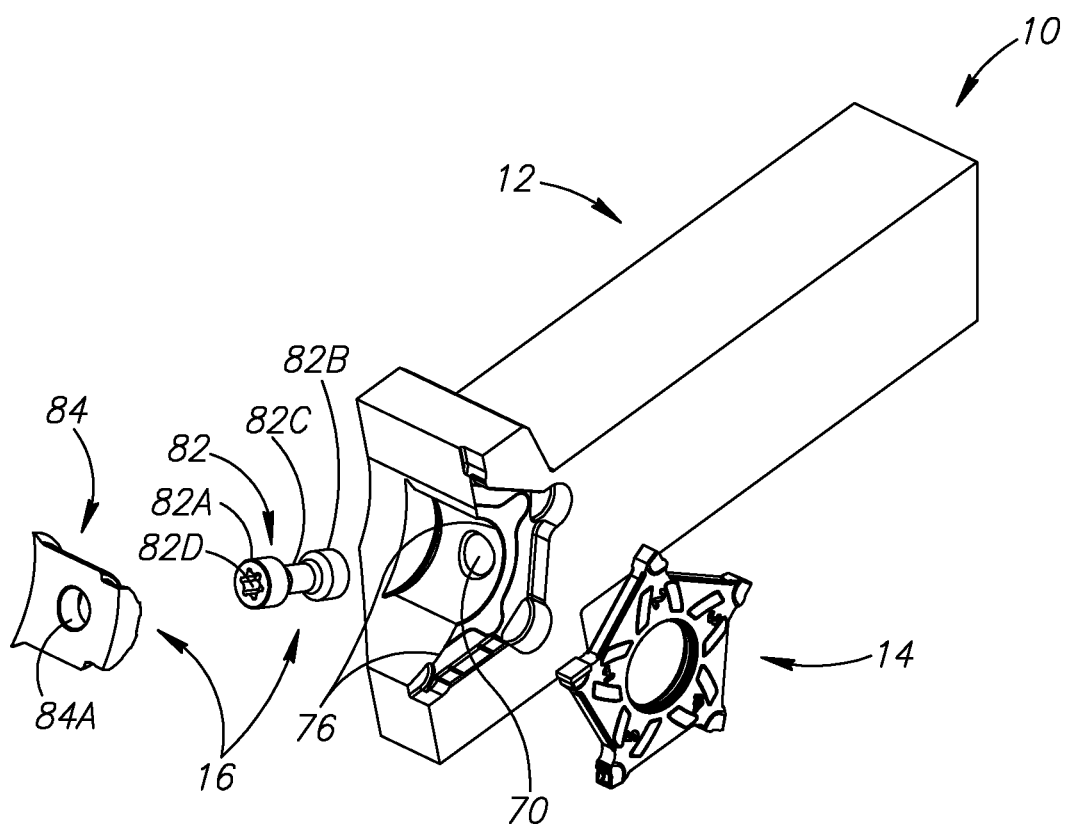
FIG. 1B is a perspective exploded view of the cutting tool assembly in FIG. 1A.

Reference is made to FIGS. 1A and 1B, which show a cutting tool assembly 10 for metal cutting operations, comprising a cutting tool 12 and a cutting insert 14 configured for being secured to the cutting tool 12 via a clamping mechanism 16.

Figure 1C:
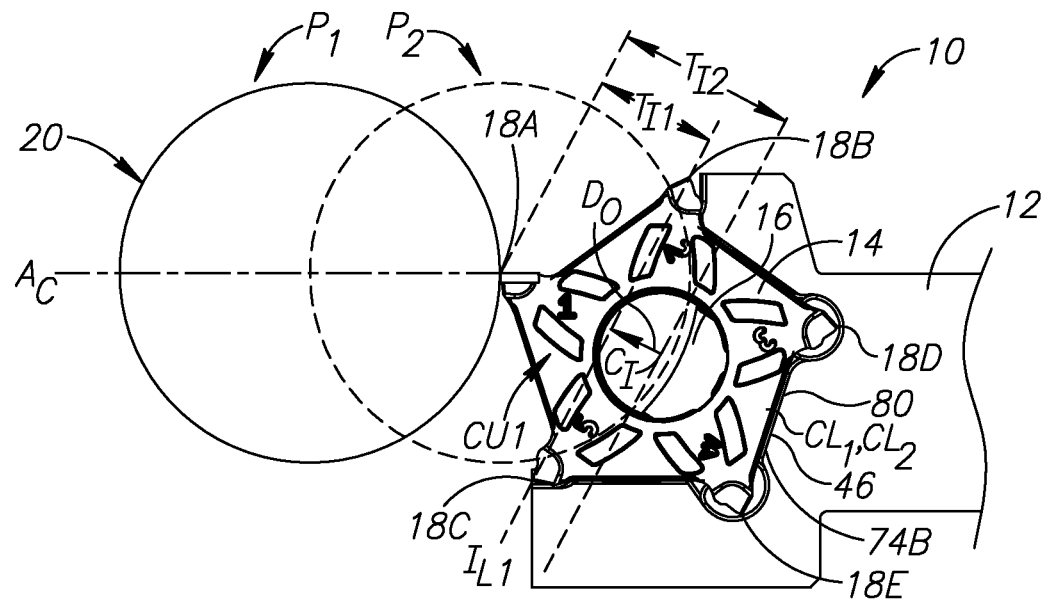
FIG. 1C is a side view of a portion of the cutting tool assembly in FIGS. 1A and 1B, also including a metal workpiece in starting and ending positions of a machining process.
Figure 1D:
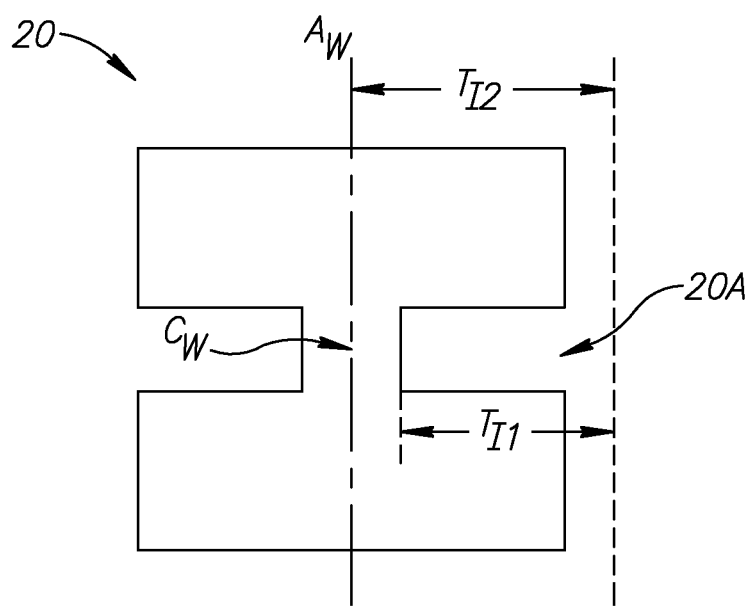
FIG. 1D is a plan view of the workpiece in FIG. 1C during an intermediary position of the machining process.

Referring also to FIGS. 1C and 1D, the cutting insert 14 comprises cutting edges 18 which are wider than, in this non-limiting example, any other portion of the cutting insert 14 and which define an insert depth of cut $T_I$. It will be understood from the description below that instead of cutting edges being wider than any other portion of a cutting insert they could also be theoretically wider than any portion of a cutting region of the cutting insert. Additionally, in the specification and claims, the terms wide and width, when referring to a cutting insert, are to be measured along a width axis $A_W$ (FIG. 2B), defined hereinafter.

To elaborate, during operation a workpiece 20 and the cutting insert 14 can be moved towards each other along a cutting axis $A_C$. It is understood that the workpiece 20 can be moved while the cutting insert 14 remains unmoved, vice versa, or both can be moved simultaneously or in turn. In any case, an operative or central cutting edge 18A begins cutting the workpiece 20 upon engagement at an initial cutting position designated as $P_1$. After further movement, during which the workpiece 20 and the cutting insert 14 converge towards each other, the workpiece 20 can be considered to be at, what can be considered in this example as, an intermediary position (at which point in time a cut produced resembles an annular groove 20A having a rectangular cross-section, in the view shown in FIG. 1D). If it is desired to part the workpiece 20 into two parts (not shown), such converging movement can continue until the central cutting edge 18A reaches a workpiece center point $C_W$, which in this example can occur when the workpiece 20 reaches a final position $P_2$, shown in dashed-lines in FIG. 1C.

Since the cutting insert 14 is devoid of a portion, for example a seating portion, in a first insert cutting region $CU_1$, defined between the central cutting edge 18A and an imaginary straight line $I_{L1}$ connecting two adjacent peripheral cutting edges 18B, 18C, which is wider than the central cutting edge 18A, the cutting insert 14 can cut the workpiece 20 to a first insert cutting depth of cut $T_{I1}$.

Figure 2A:
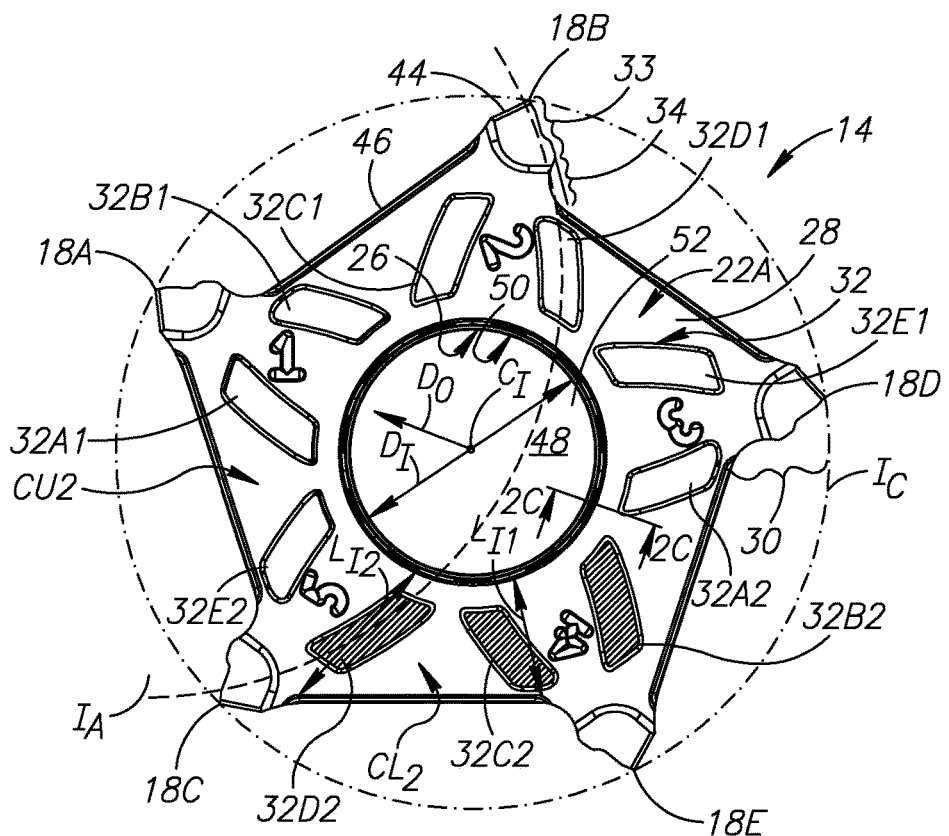
FIG. 2A is a side view of a cutting insert of the cutting tool assembly in FIGS. 1A to 1C.

Referring also to FIG. 2A, the cutting insert 14 can even cut to a second insert cutting depth of cut $T_{I2}$ (FIG. 1C), which extends until an imaginary arc $I_A$ (FIG. 2A) inscribed within the two non-operative or peripheral cutting edges 18B, 18C and opening in an outward direction $D_O$, directed from an insert index axis $C_I$ towards the central cutting edge 18A. Thus, the depth of cut of the cutting insert can extend to at least the index axis $C_I$. A region of the cutting insert 14 extends between the imaginary arc $I_A$ and central cutting edge 18A thereof, defining a second insert cutting region $CU_2$. In FIG. 1C, the imaginary arc $I_A$ is not separately indicated since it coincides with a portion of the dashed-outline of the workpiece 20 in the final position $P_2$. The imaginary arc $I_A$ is normally preferably as large as possible, and hence could be designed to extend to the reinforced portions 33 (FIG. 2A, described hereinafter) of the peripheral cutting edges 18B, 18C, and more preferably to points directly adjacent to the peripheral cutting edges 18B, 18C, bearing in mind manufacturing limitations.

It is understood that an optimized depth of cut can be achieved by selection of appropriate workpiece having a diameter corresponding to or approaching a diameter of such an imaginary arc $I_A$.

Possible advantages of such construction can include depth of cut, which can be greater than depth of cut of a comparative cutting insert having a, for example, seating portion which is wider than a central cutting edge thereof and which is disposed in the cutting region thereof.

Another factor which can facilitate an advantageous depth of cut is a shape of the front boundary $B_F$ (FIG. 1A) of the cutting tool 12. In particular a concave-shape or curved shape can be advantageous as it can, for example, allow a depth of cut of a cutting insert to be completely utilized, especially cutting inserts configured to cut to imaginary arcs of the type described above. The front boundary $B_F$ is defined as a portion of a cutting tool 12 configured to be brought towards a portion of a workpiece being cut (during cutting motion along the cutting axis $A_C$).

For ease of understanding, a region of a cutting insert which is outside of, or complements, a cutting region thereof is hereinafter called a clamping region. For example, referring to FIG. 1C, the first cutting region $CU_1$, which extends to the left of the imaginary straight line $I_{L1}$, is complemented by a first clamping region $CL_1$, which extends to the right thereof. Referring to FIG. 2A, for ease of understanding as the imaginary arc $I_A$, is not shown in FIG. 1C, the second cutting region $CU_2$, which extends to the left of the imaginary arc $I_A$, is complemented by a second clamping region $CL_2$, which extends to the right thereof.

Figure 2B:
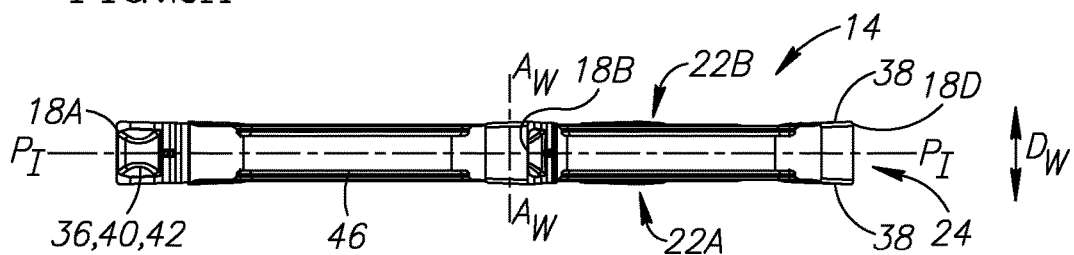
FIG. 2B is an end view of the cutting insert in FIG. 2A.
Figure 2C:
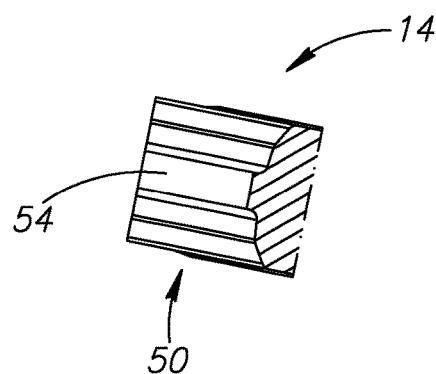
FIG. 2C is a cross section view taken along line 2C-2C in FIG. 2A.

Referring to FIGS. 2A to 2C, features of the cutting insert 14 will now be further detailed.

The cutting insert 14 comprises parallel insert first and second sides 22A, 22B connected by an insert peripheral surface 24 which extends peripherally around the cutting insert 14, and a clamping hole 26 which in this non-limiting example is a through-hole which opens out to both of the insert first and second sides 22A, 22B. The shape of the cutting insert 14 can comprise a disc-shaped body portion 28 and cutting portions 30, each of the cutting portions 30 extending from a periphery of the body portion 28 and comprising one of the cutting edges 18.

Formed at the insert first and second sides 22A, 22B can be, in this non-limiting example, a plurality of side seating surfaces 32. The side seating surfaces 32 can be outwardly-spaced from the associated insert first and/or second side 22A, 22B. To elaborate, the side seating surfaces 32 can be the most outward surface of a projection extending from one of the insert first or second side 22A, 22B, though they still do not extend past the cutting edges in the axial direction along the insert's index axis $C_I$. The plurality of side seating surfaces 32 can further include operative pairs, i.e. which are intended to be operative simultaneously, for example pairs located on opposing sides of the insert 14. In this example pairs of side seating surfaces are designated with a common letter. For example, a pair of side seating surfaces designated 32D1, 32D2 are located on opposing sides of the insert first side 22A. A possible advantage of such spacing, i.e. at distal sides of an insert, can be increased mounting stability of the cutting insert.

A location of such pair can also coincide with, or be adjacent to, a path of an imaginary arc or line which can constitute a boundary of a cutting region of the cutting insert 14.

Further, each side seating surface 32 can be elongated and/or curved.

Additionally, it is noted that at least three of the side seating surfaces (for example 32D1, 32D2 and 32A2) can each be located in the clamping region $CL_2$ of the cutting insert 14. Such triangular arrangement can facilitate mounting stability. It is noted that there can be side seating 32 located in both a cutting region and clamping region associated with a single central cutting edge, i.e. without the presence of such seating surfaces 32 reducing cutting depth of an insert.

Another possible advantage of a plurality of side seating surfaces on a single side of an insert, can be reduced manufacturing time of the cutting insert. For example a grinding operation, may be shorter, at least when compared with a single side seating surface that extends over a greater area of a comparative cutting insert.

It is also feasible for a cutting tool (not shown), to comprise projections which are configured to abut the cutting insert 14 at designated points on one of the insert first or second sides 22A, 22B. In such case the cutting insert 14 could be devoid of a side seating surface, or at least an outwardly-located side seating surface.

The insert peripheral surface 24 comprises the cutting edges 18, which are spaced-apart along the peripheral surface of the cutting insert 14. In this non-limiting example, there are exactly five cutting edges 18. Regardless of the number of cutting edges 18, they can be evenly spaced-apart and can lie along an imaginary circumscribed circle $I_C$ of the cutting insert 14. In this example, the cutting insert 14 fulfills the condition: 360°/5=72°, and hence the cutting insert 14 has 5-way rotational symmetry of 72° about the insert index axis $C_I$. It is understood in this context that an insert index axis is an axis about which the cutting insert can be rotated a finite number of times to present a different operative cutting edge. For example, after an operative cutting edge is no longer effective, such cutting insert can be rotated about the insert index axis thereof to present an unused cutting edge as a new operative cutting edge. It is also understood that the insert index axis can extend through a geometric center of a cutting insert.

The imaginary arc $I_A$ preferably has a curvature which locates it in a position such that the insert index axis $C_I$ is interposed between the arc $I_A$ and an associated central cutting edge 18A. Even more preferably, the arc $I_A$ has a curvature corresponding to a curvature of the imaginary circle $I_C$. A possible advantage of such preferred curvatures can be increased depth of cut. Thus, the cutting insert can provide a depth of cut which extends to at least the insert index axis $C_I$.

As shown in FIG. 2B, the cutting edges 18 extend from, or connect, the insert first side 22A to the insert second side 22B. The extension of the cutting edges 18 can allow each cutting edge 18 to individually be, what could be called, fully effective.

Along a width direction $D_W$, which is parallel with the width axis $A_W$, defined as perpendicular to the insert first and second sides, the cutting edges 18 are wider than the cutting insert at the side seating surfaces 32.

Further to the example given above, described in connection with FIGS. 1A to 2A, it will be understood that three consecutively positioned cutting edges constitute a cutting arrangement comprising a central cutting edge disposed between two peripheral cutting edges. It is understood that a cutting insert can have multiple such cutting arrangements. For example the cutting edges 18 designated as 18A, 18B and 18D, can constitute three adjacent or consecutive cutting edges of such arrangement, whilst another cutting arrangement could include cutting edges designated as 18B, 18D and 18E, etc.

Understanding of the meaning of the word "associated", in the specification and claims, can be exemplified as follows: the cutting region $CU_1$, described in connection with FIG. 1C, is associated with the cutting edges 18A, 18B, 18C, whereas, if the cutting insert 14 would be indexed in the cutting tool 12 such that another cutting edge, for example the cutting edge designated as 18B, is an operative or central cutting edge, then an associated cutting region (not shown) would extend from the example central cutting edge 18B to an imaginary straight line (not shown), connecting two adjacent peripheral cutting edges 18A and 18D.

Each cutting edge 18 can be formed in a cutting portion 30 (FIG. 2A). More precisely, The cutting portion 30 can comprise a reinforced portion 33, comprising a cutting edge 18, and an intermediate portion 34 which connects the reinforced portion 33 to the body portion 28.

The reinforced portion 33 can further comprise a rake surface 36 formed in the insert peripheral surface 24 and over which chips (not shown) from a cut workpiece (not shown) flow, and can also comprise reinforced sidewalls 38 extending from the rake surface 36 and terminating at the intermediate portion 34.

Each rake surface 36 can lie in a plane perpendicular to the insert first and second sides 22A, 22B. The rake surface 36 can be formed with a chip-control arrangement 40. A chip control-arrangement means an arrangement configured for forming and/or directing and/or breaking a chip (not shown) of a workpiece. In this example, the chip-control arrangement 40 comprises a recess 42.

The reinforced sidewalls 38 can provide the cutting insert 14 with sufficient reinforcement to allow transverse cutting motion, i.e. transverse to an imaginary insert plane $P_I$ (FIG. 2B) that bisects the peripheral surface 24 and is parallel to the insert first and second sides 22A, 22B.

The reinforced sidewalls 38 taper inwardly, from an associated cutting edge 18. Such tapering constitutes a gradual decrease of the width (i.e. devoid of a step-configuration), along the width direction $D_W$ of the cutting insert, from each of the cutting edges to a portion of the cutting insert 14 which is closer to the insert axis $C_I$ than to the cutting edges 18. In this case, the portion which is tapered or decreases in width is the reinforced portion 33. It is noted that a cutting region CU can still be inclusive of the reinforced sidewalls, or at least a portion thereof which is thinner than the cutting edges 18.

The width of the intermediate portion 34 can correspond to the width of the body portion 28 for efficient manufacture of the cutting insert 14. A possible advantage of such construction can be provision of a grinding safety area (constituted by the intermediate portion 34).

The reinforced portion 33 can further comprise a relief surface 44, formed in the insert peripheral surface 24, and extending from an associated cutting edge 18. Each relief surface 44 can form an acute relief angle α with an peripheral seating surface 46. Such acute relief angle α can allow efficient chip flow, more than a comparative collinear relief surface and peripheral seating surface.

The peripheral seating surface 46 can be formed in the insert peripheral surface 24. More precisely the insert peripheral surface 24 can comprise a plurality of peripheral seating surfaces 46, each of which extend along a straight path from a first insert cutting portion 30 to an adjacent second insert cutting portion 30. A distance of each of the peripheral seating surfaces 46 to the insert index axis $C_I$ can vary along different points of the path. An example of an insert narrowest wall length or narrowest distance is designated as $L_{I1}$, and an example of an insert thickest wall length or thickest distance, which is greater in magnitude than the insert narrowest wall length $L_{I1}$, is designated as $L_{I2}$. The insert narrowest wall length $L_{I1}$ is measured to a point of the peripheral seating surface 46 adjacent to a rake surface 36 of a cutting edge 18, whereas the insert thickest wall length $L_{I2}$ is measured to a point of the peripheral seating surface 46 adjacent to a relief surface 44 of a cutting edge 18, Each of the peripheral seating surfaces 46 can be flat, which can facilitate stable mounting of the insert and/or smooth insertion/removal thereof to the cutting tool 12.

The clamping hole 26 is configured with a clamping hole portion 48 in the clamping region CL. The clamping hole portion 48 is configured with a size configured to accommodate a cross-section of a clamp which has sufficient size to resist bending while clamping the cutting insert 14 (in this example the cross section is taken along a clamp plane $P_C$ shown in FIGS. 4B and 4C, and described in further detail hereinafter). Such cross-section is preferably entirely located within the clamping region CL to avoid reducing a cutting depth of the cutting insert 14.

While determination of a sufficient size of the clamping hole portion 48 can differ in accordance with many variables such as shape of a clamp, material of the clamp, size of a cutting insert and operative conditions thereof, etc., such sufficiency can be tested by a test to see if such clamp or cross-section thereof is of sufficient strength to maintain a cutting insert in a clamped position during operation. A cutting tool assembly 10 built in accordance with the present non-limiting example shown in FIGS. 1A to 2C, and comprising a clamping hole portion 48 defined between a clamping hole edge 50 and the arc $I_A$ and which has a crescent shaped clamping area 52 (as shown in the view shown in FIG. 2C), as well as a clamp 84 (FIGS. 4B and 4C) having a crescent-shaped cross section taken along a clamp plane $P_C$ which is configured to engage the crescent shaped clamping hole portion 48, was successfully tested. Accordingly, a clamping hole portion 48 having a clamping area of about 3%, of an area defined within the imaginary circumscribed circle $I_C$ of the cutting insert 14, is feasible. It is believed that a configuration wherein a clamping hole portion having an area of at least 2% of an area of an imaginary circumscribed circle $I_C$, can also be feasible. Larger areas could obviously also be feasible, for example an area can be greater than 4% as in the example in FIG. 7B, which discloses a different clamping arrangement than the lever system described in connection with FIGS. 1A to 4C.

The clamping hole edge 50 is shown in more detail in FIG. 2C. A generally tapering cross-section and inwardly projecting central annular projection 54 can be formed for enabling clamping of a clamp 84 thereto. Alternatively, the clamping hole edge 50 can be devoid of an annular projection 54, dependent on a clamping mechanism to be used therewith.

The cutting insert 14 can typically be made of extremely hard and wear-resistant material such as cemented carbide, either by form-pressing and then sintering carbide powders in a binder or by powder injection molding methods.

The cutting insert 14, or more precisely, each insert side seating surface 32, can be ground, i.e. subjected to a grinding operation for shape formation thereof. Since the cutting edges 18 are wider than the cutting insert 14 at the insert side seating surfaces 32, the grinding operation can be designed to prevent contact of a grinding element (not shown) with the cutting edges 18. For example a grinding element may be moved in circular or round motions within a circle (not shown) inscribed within the cutting edges 18, preferably such inscribed circle is defined within the reinforced portion 33 of the cutting insert 14. In the latter case, the intermediate portion 34 may constitute a grinding safety area for inaccurate movement. Alternatively, a grinding element could make straight passes from between a pair of the cutting edges 18 or preferably between a pair of the cutting portions 30, to between a spaced pair of opposing cutting edges 18 or cutting portions 30. In either case the cutting insert 14 can be rotated during grinding thereof, and the grinding element can also be oscillated. Such grinding can be carried out on one side of the cutting insert 14 and then the other side, or simultaneously on both sides.

In this non-limiting example the cutting insert 14 is symmetric about the insert plane $P_I$. Such symmetry can allow cutting of rectangular shapes, as exemplified in FIG. 1D.

It is understood that above references to symmetry do not refer to non-operative or cutting features such as edge-identifying numerals. Additionally, it is understood that side seating surfaces may not be symmetrically positioned or even in number, in contrast with the present example where they are both symmetrically located on both the insert first and second sides, and with respect to each cutting edge, and even in number.

Figure 3A:
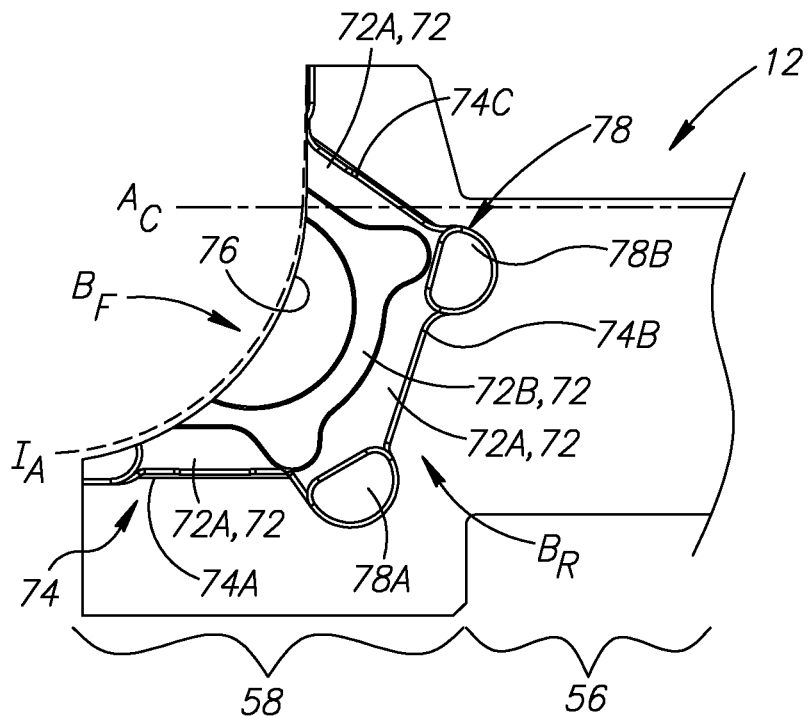
FIG. 3A is a side view of a portion of a cutting tool of the cutting tool assembly in FIGS. 1A to 1C.
Figure 3B:
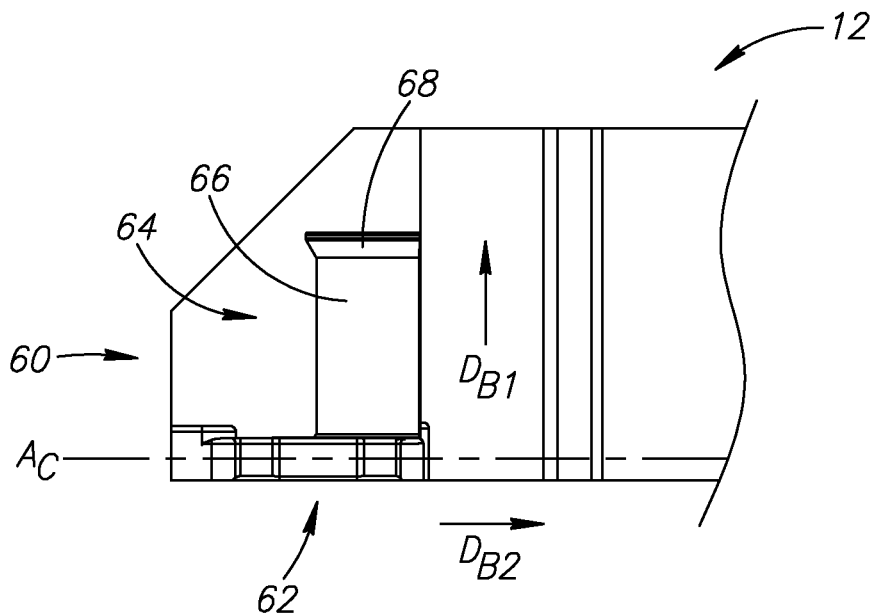
FIG. 3B is a plan view of the portion of the cutting tool in FIG. 3A.

Referring now to FIGS. 3A and 3B, the cutting tool 12 will be described in further detail.

The cutting tool 12 can comprise a tool body 56 and a tool head 58 connected thereto.

The tool head 58 can comprise a first face 60, which in this non-limiting example extends transverse and, more precisely, can extend perpendicular, to the cutting axis $A_C$. The tool head 58 also comprises an insert pocket 62, which can extend transversely to the first face 60.

The first face 60 can have a concave shape. The first face 60 can be formed with a clamping mechanism recess 64.

The clamping mechanism recess 64 can open out to the first face 60 and can open out to the insert pocket 62. More precisely, the clamping mechanism recess 64 can comprise a first sub-recess 66 configured for receiving a clamp body portion 84B (FIG. 4B) and a second sub-recess 68 for receiving a clamp element positioning portion 84C.

The first sub-recess 66 can be formed with a concave shape.

The second sub-recess 68 can have a tapering shape which grows in a first biasing direction $D_{B1}$ away from the clamp body portion 84B. The first biasing direction $D_{B1}$ can be transverse, and more precisely in this example perpendicular, to the cutting axis $A_C$.

The first face 60, and more precisely in this example the clamping mechanism recess 64 thereof, can be formed with an internally threaded tool screw bore 70 (FIG. 1B).

The insert pocket 62 is configured to receive the cutting insert 14. The insert pocket 62 comprises a pocket seating surface 72, at least one pocket wall 74 extending transversely from the pocket seating surface 72 and defining a pocket rear boundary $B_R$, and a pocket front edge 76 located on an opposing side of the pocket seating surface 72 from the pocket rear boundary $B_R$ and located at the front boundary $B_F$ of the cutting tool 12.

The pocket seating surface 72 can comprise a first seating sub-surface 72A configured for engaging the cutting insert 14, and a second seating sub-surface 72B which is located between the first seating sub-surface 72A and pocket front edge 76 and is recessed in the first biasing direction $D_{B1}$ to ensure that the cutting insert 14 contacts the seating first sub-surface 72A for stabilized mounting thereof.

The at least one pocket wall 74 can comprise first, second and third consecutively positioned pocket sub-walls 74A, 74B, 74C. The pocket sub-walls 74A, 74B, 74C are separated by first and second pocket relief recesses 78A, 78B. Notably, the first and third pocket sub-walls 74A, 74C, are positioned to abut the cutting insert's peripheral seating surfaces 46 when the cutting insert 14 is mounted in the insert pocket 62, whereas the second pocket sub-wall 74B is positioned to be spaced from an associated cutting insert's peripheral seating surface 46, as seen by a pocket gap 80 shown in FIG. 1C, for facilitating stabilized mounting.

Referring now to FIG. 1B, the clamping mechanism 16 comprises a biasing member 82, which in this non-limiting example is constituted by a double-ended externally threaded screw, and a clamp 84.

The screw 82 can comprise a first externally threaded end 82A configured for threaded engagement with a clamp screw bore 84A, a second externally threaded end 82B configured for threaded engagement with the tool screw bore 70, and a screw intermediate portion 82C extending between the first and second threaded ends 82A, 82B and which can be devoid of threading. The first threaded end 82A being further formed with a tool-receiving recess 82D for facilitating rotation thereof.

It is understood that, alternatively, the biasing member 82 could be a single-ended screw, elastic jaw or other suitable biasing component (not shown).

Figure 4A:
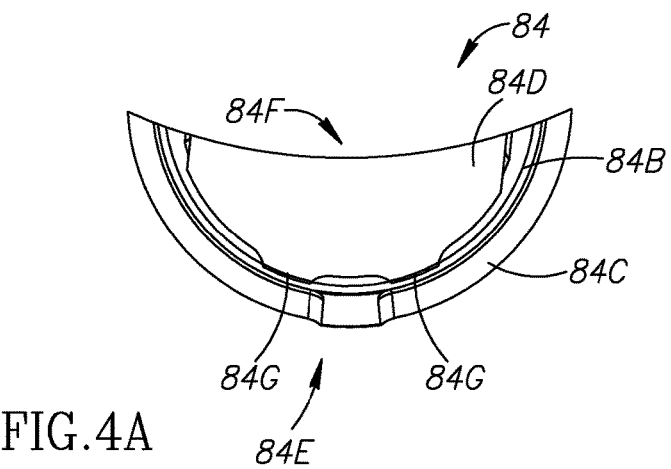
FIG. 4A is a plan view of a clamp of the cutting tool assembly in FIGS. 1A to 1C.
Figure 4B:
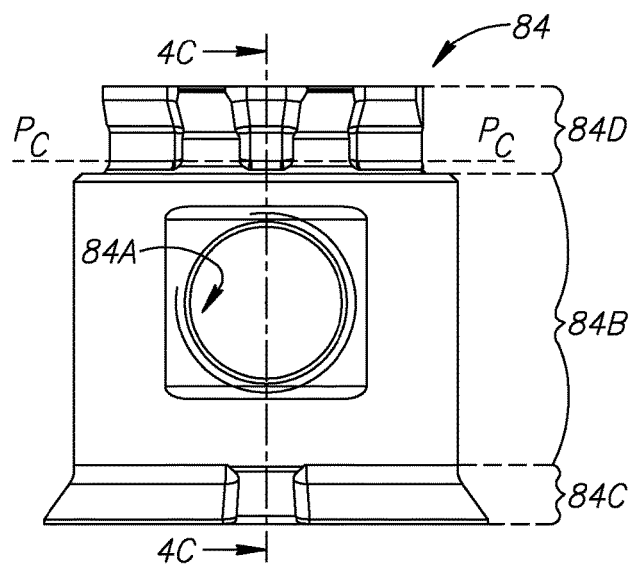
FIG. 4B is a side view of the cutting insert in FIG. 4A.
Figure 4C:
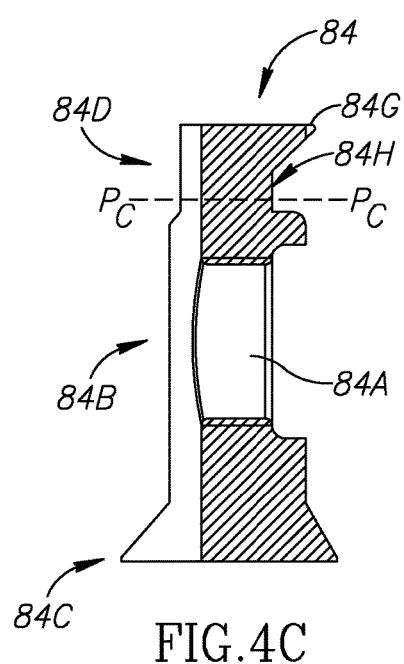
FIG. 4C is a cross section view taken along line 4C-4C in FIG. 4B.

Referring to FIGS. 4A to 4C, the clamp 84 can further comprise a clamp body portion 84B through which the clamp screw bore 84A extends, and positioning and head portions 84C, 84D. As shown in FIG. 4A, the clamp 84 has a crescent shape with a convex clamp front surface 84E and a concave clamp rear surface 84F.

The clamp body portion 84B can be configured to be received partially or, in this example, fully within the cutting tool's first sub-recess 66.

The positioning portion 84C can have a shape which tapers outwardly as it increases in distance from the clamp body portion 84B.

The clamp head portion 84D can be formed with two clamp prongs 84G (which can be spaced-apart from each other for stabilized clamping), at the clamp front surface 84E thereof and projecting in a direction away from the rear surface 84F, and an insert receiving recess 84H formed between the prongs 84G and the clamp body portion 84B.

A clamp plane $P_C$ passing through the insert receiving recess 84H corresponds in cross-sectional shape and area to the cutting insert's clamping hole portion 48. It is understood that, in this configuration, the greatest forces from the cutting insert 14, while cutting, are exerted on the insert receiving recess 84H. Accordingly the constructional strength of the insert receiving recess 84H can determine a minimum size clamping area of the clamping hole portion 48.

Referring to FIGS. 1A to 1C, the cutting insert 14 can be clamped to the cutting tool's tool head 58 via the clamping mechanism 16 as follows:

inserting the biasing member's second threaded end 82B into the tool screw bore; mounting the clamp 84 on the biasing member's first threaded end 82A;

rotating the biasing member 82 via the tool-receiving recess 82D thereof, to move the biasing member 82 and clamp 84 towards the tool head 58 and to a mounting position wherein the clamp 84 is spaced-apart from the first sub-recess 66;

placing the cutting insert 14 in the insert pocket 62, the clamp's head portion 84D being located inside the cutting insert's clamping hole 26; and rotating the biasing member 82 to move the clamp 84 into a secured position (FIG. 1C). Such "rotating", when the biasing member 82 is located in the first sub-recess 66, can cause the clamp prongs 84G to engage the clamping hole edge 50 and bias the cutting insert 14 against the pocket wall 74 (more precisely the first and third pocket sub-walls 74A, 74C). More precisely, the biasing member 82 causes movement of the clamp 84 in a second biasing direction $D_{B2}$, which is parallel with the cutting axis $A_C$, and the positioning portion 84C contacts the correspondingly tapered shaped second seating sub-surface 72B, which causes movement of the clamp 84 and consequently the cutting insert 14 in the first biasing direction $D_{B1}$.

Indexing the cutting insert 14, may be carried out by:

rotating the biasing member 82 via the tool-receiving recess 82C thereof in an opposite direction to the direction rotated for clamping, until the clamp 84 reaches the mounting position;

rotating the insert 14, removing it completely from the clamp 84 if necessary, such that another cutting edge 18 becomes a central cutting edge 18A thereof; and bringing the clamp 84 to the secured position as described above.

In the secured position, in a view perpendicular to the pocket seating surface 72 (for example the side view of the mounted insert seen in FIG. 1C, the pocket seating surface 72 being shown in FIG. 3A), the tool head 58 and clamping mechanism 16 do not extend past the imaginary inscribed arc $I_A$ extending along the front boundary $B_F$. Stated differently, the biasing member 82 and clamp 84 are flush with the front boundary $B_F$ and/or sunken or depressed into the front face 60. Such arrangement can allow a cutting insert 14 to utilize the entire cutting depth $T_{I2}$. Thus, despite a clamping mechanism 16 or component thereof being positioned at the front face 60 of a cutting tool 12, such arrangement can be utilized without reducing cutting depth of an insert.

It is understood that 'perpendicular' view is intended to convey a view orientation only, and hence the pocket seating surface 72 may be partially or completely obscured from sight by the cutting insert 14 or a portion of the cutting tool 12, and still fall within the definition of such view A possible advantage of the clamp 84 or at least clamp body portion 84B being configured to be secured to the tool head 58 at the front boundary $B_F$ or along the front face 60, can be that a compact cutting tool assembly 10 can be achieved. For example, compared with a cutting tool assembly (not shown) having a clamp extending along a sidewall of a cutting tool thereof.

One way of increasing cutting depth of a cutting insert, can be by forming a clamping area as distanced as possible from a central cutting edge of the cutting insert. As cutting inserts of the type described above have cutting edges spaced apart along a peripheral surface thereof, such clamping area, while advantageously being as distanced as possible from the central cutting edge, resulting also become proximate to a cutting edge on an opposing side of such cutting insert from the central cutting edge. Stated differently, since each cutting edge constitutes, when indexed, an operative or central cutting edge, at least one clamping area is located proximate to such central cutting edge. Stated differently yet, such cutting insert will normally have clamping areas proximate and distal to each cutting edge thereof. It is understood that if a clamping area adjacent to a central cutting edge, i.e. a non-associated clamping area, would be clamped during operation of the cutting insert, a reduction of cutting depth would likely result. To avoid reduction of cutting depth, at least a portion of such cutting insert's cutting hole is unoccupied when it is mounted to a cutting tool. Stated differently, when mounting a cutting insert to a clamp, for example as part of the method described above, a clamp body of the clamp can be extended, completely through at least a first portion of at least one clamping hole of the cutting insert, while leaving a second portion, distinct from the first portion, of the at least one clamping hole unoccupied.

Figure 5:
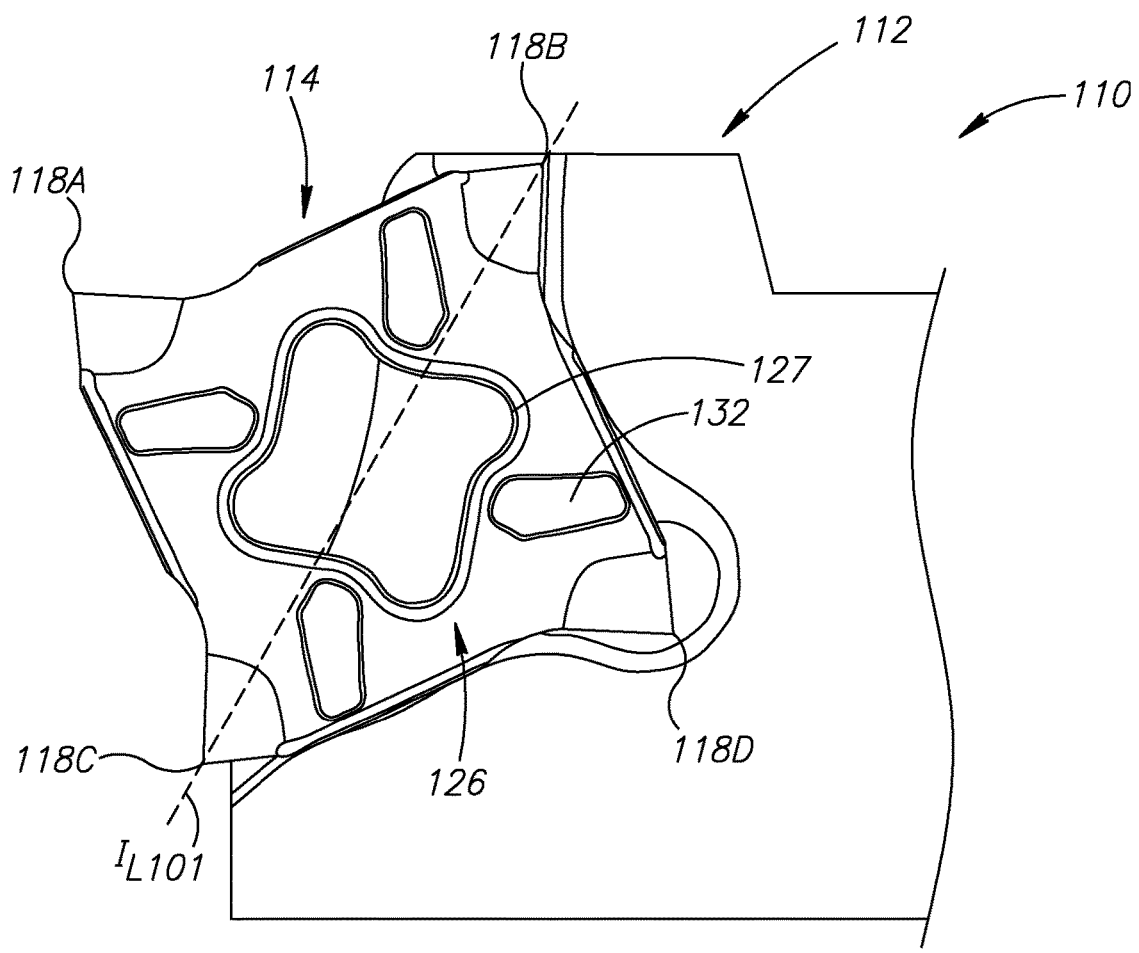
FIG. 5 is a schematic side view of another cutting insert and cutting tool.

With reference to FIG. 5, an example cutting insert 114 mounted to a cutting tool 112 is shown.

The cutting insert 114 is similar to the above-described insert 14, in particular, for example, regarding the widths thereof, yet differs in that it has four cutting edges 118A, 118B, 118C and 118D, rather than five.

It is also noted that the clamping hole 126 thereof is not circular, but rather has four concave portions 127, enabling a clamp (not shown) to be distanced from the central cutting edge 118A thereof.

It is consequently understood that any clamping hole shape allowing an advantageous cutting depth is feasible. An advantageous cutting depth can be considered one deeper than known cutting inserts of the same type (i.e. an indexable cutting insert with cutting edges extending along a peripheral surface thereof, and between first and second sides thereof). Accordingly, even though the five-edged cutting insert 14 of the type described above can possibly achieve a greater cutting depth than the four-edged cutting insert 114 shown, the latter cutting insert 114 can still cut to a depth greater than known cutting inserts of the same type, and can therefore be considered as having an advantageous construction.

Figure 6:
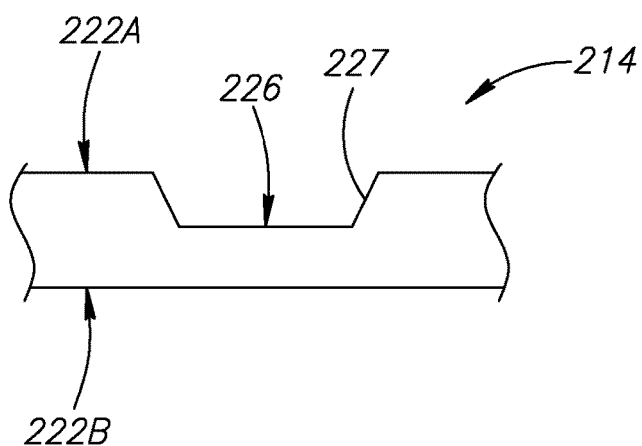
FIG. 6 is a schematic side view of a portion of yet another cutting insert.

With reference to FIG. 6, it is understood that a clamping hole 226, of a cutting insert having at least some of the advantages mentioned, can also be a blind-hole, as opposed to the through-holes 26, 126 exemplified above. Such blind clamping hole 226 formed in only one of the two side surfaces 222A, 222B can have slanted edges 227 to assist clamping thereof. Such design being considered feasible, yet not as advantageous as the through-hole arrangements described above, in view of, inter alia, stronger clamping advantages and the disadvantage of a bulkier cutting tool, mentioned above.

Figure 7A:
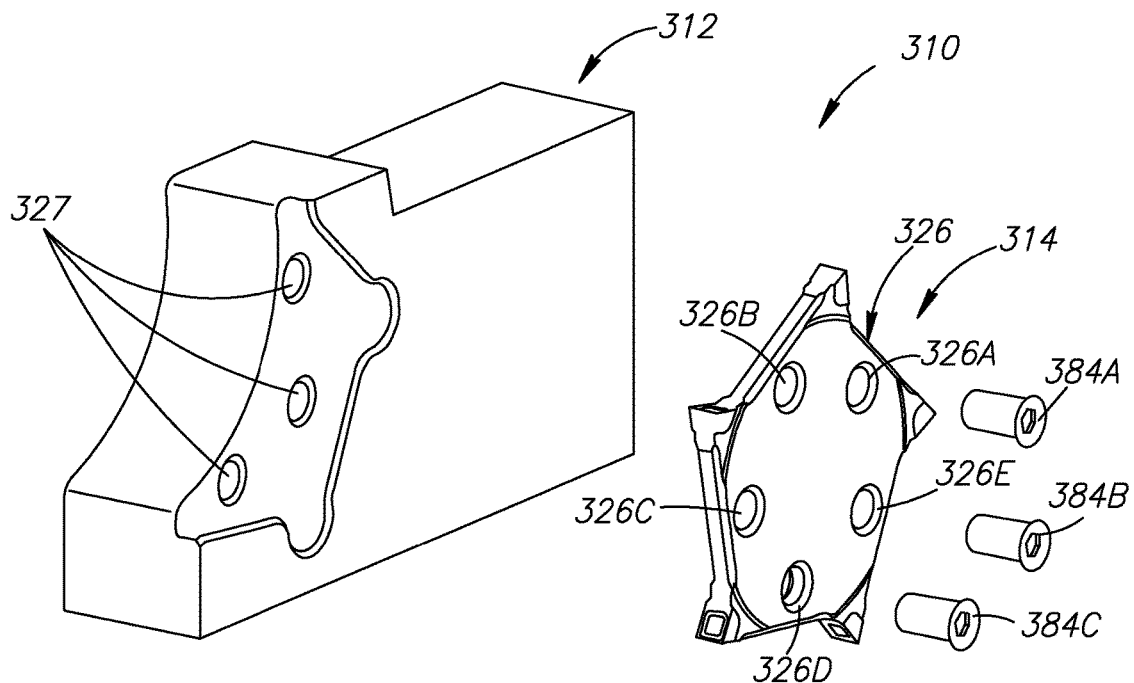
FIG. 7A is a perspective exploded view of a further cutting tool assembly.
Figure 7B:
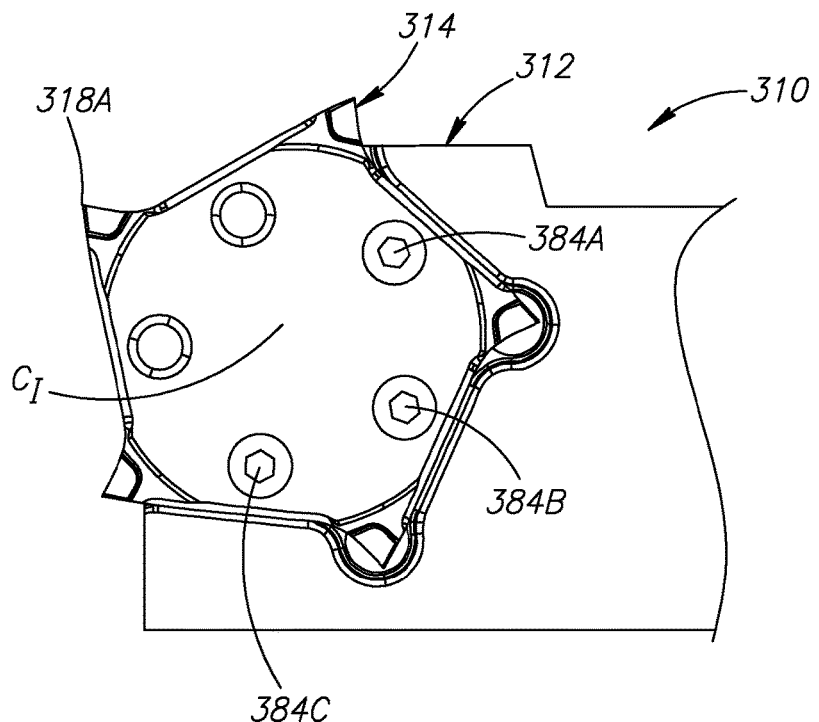
FIG. 7B is side view of a portion of the cutting tool assembly in FIG. 7A.

Referring now to FIGS. 7A and 7B, an alternative clamping hole arrangement is shown in cutting tool assembly 310. Notably, a plurality of clamping holes 326A, 326B, 326C, 326D and 326E are formed in the cutting insert 314. The clamping holes 326 can be secured to bores 327 of a cutting tool 312 via a clamping mechanism 316 comprising three clamps 384A, 384B, 384C, which in this example are in the form of screws. As seen in this embodiment, none of the clamping holes 326A, 326B, 326C, 326D and 326E contain the insert index axis $C_I$.

Such arrangement can be advantageous in that a larger cutting region and hence cutting depth may be achieved, when compared with a single clamping hole, since the plurality of cutting holes may be positioned closer to a peripheral surface of a cutting insert thereby allowing clamping of the cutting insert 314 to be carried out further from a central cutting edge 318A. However, the arrangement described in connection with FIGS. 1 to 4, may be advantageous over the present example in that, for example, efficient clamping is enabled (i.e. a single clamp is fastened and not three clamps, and without falling parts, etc.).

Figure 8A:
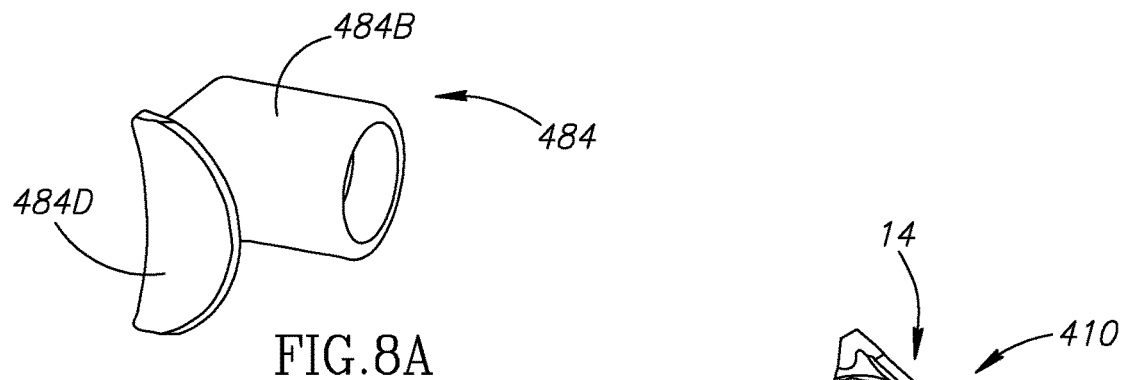
FIG. 8A is a perspective view of another clamp.
Figure 8B:
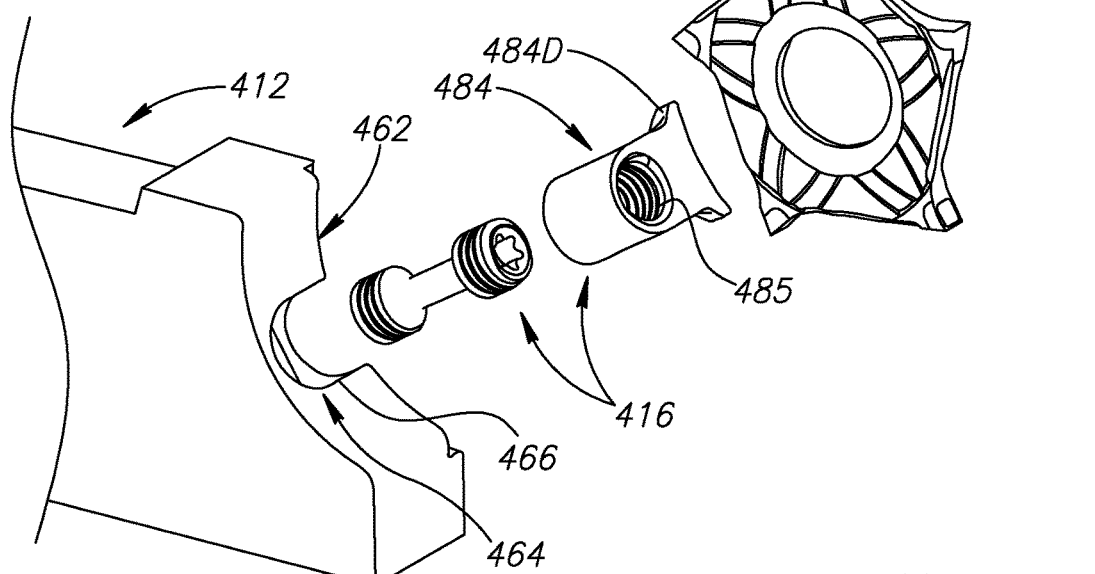
FIG. 8B is a perspective exploded view of a cutting tool assembly comprising the clamp in FIG. 8A.
Figure 8C:
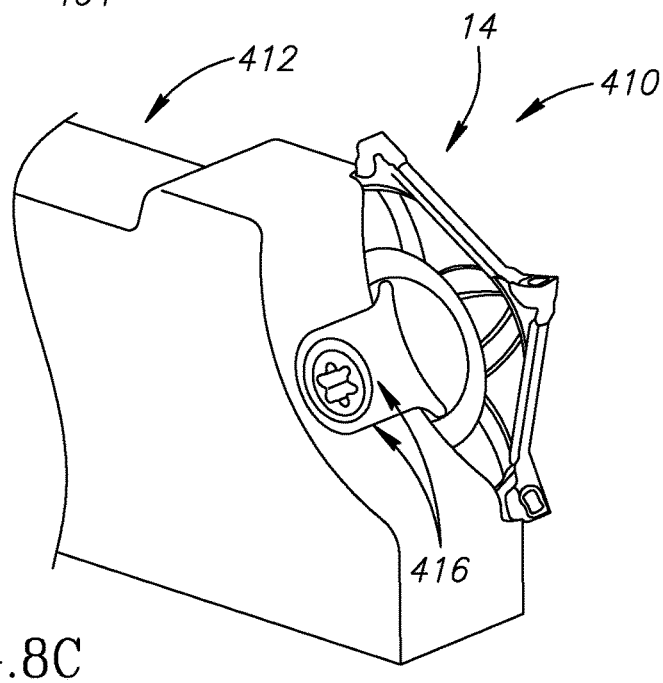
FIG. 8C is a perspective view of the cutting tool assembly in FIG. 8B.

With reference to FIGS. 8A to 8C, a cutting insert 14 of the type described above can also be mounted to a different cutting tool 412 of clamping assembly 410 through a different clamping mechanism 416.

The clamping mechanism 416 differs in that the clamp 484 thereof comprises a cylindrical body portion 484B, formed with internal threading 485.

Notably, a clamp head portion 484D of the clamp 484 is essentially the same as the above-described clamp head 84D (for example including one or more prongs (not shown), and having a crescent shape).

A further difference is that the clamp 484 is devoid of a positioning portion. Notably, the elongated cylindrical shape of the body portion 484B can facilitate smooth motion of the clamp 484 into a clamping mechanism recess 464 of the cutting tool 412. Such arrangement may be advantageous over an arrangement described with a tapered positioning portion of the type described above, in that the clamp 484 has less contact points (or at least is devoid of a contact point of a positioning portion) which can allow for smooth movement within a clamping mechanism recess 464, there may be reduced division of forces when moving the clamp 484, etc.

Due to the modified shape of the clamp 484, the clamping mechanism recess 464 shape can be correspondingly modified. More precisely, the clamping mechanism recess 464 can be devoid of a second sub-recess, and the first sub-recess 466 can have a U-shape opening out to the insert pocket 462.

Figure 9A:
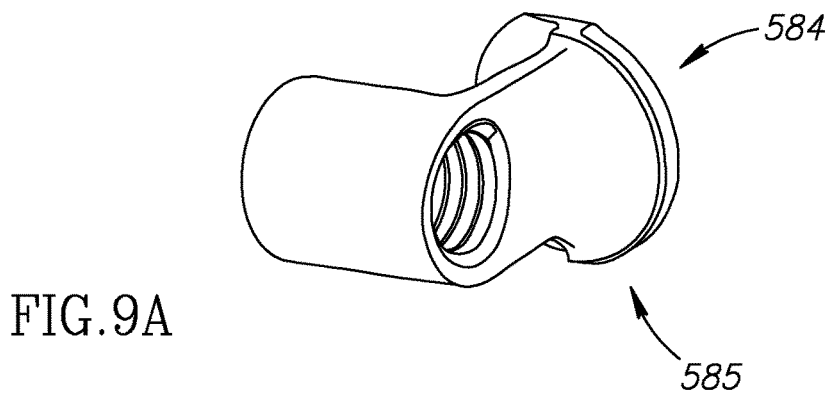
FIG. 9A is a front perspective view of yet another clamp.
Figure 9B:
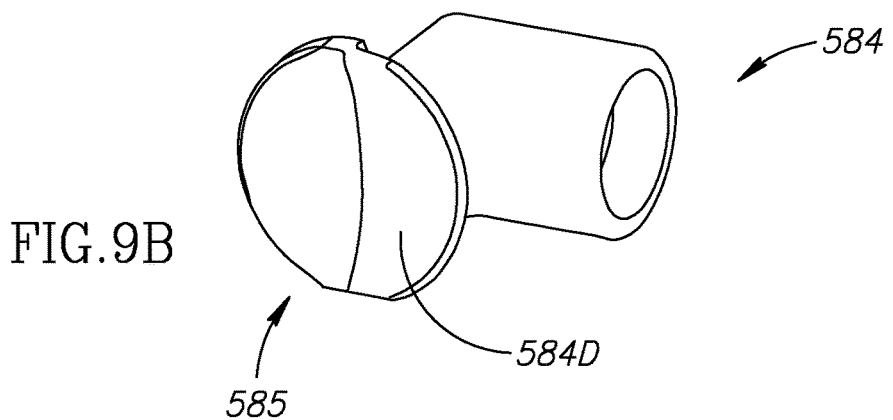
FIG. 9B is a rear perspective view of the clamp in FIG. 9A.
Figure 9C:
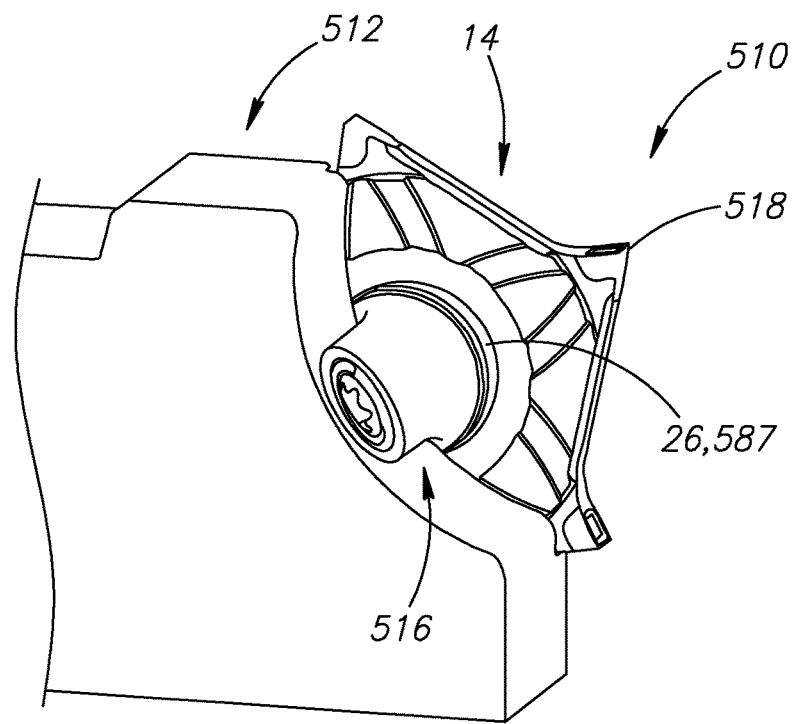
FIG. 9C is a perspective exploded view of a cutting tool assembly including the clamp in FIGS. 9A and 9B.

With reference to FIGS. 9A to 9C, a cutting insert 14 of the type described above can also be mounted to a different cutting tool 512 using a different clamp 584.

The example cutting tool assembly 510 shown in FIGS. 9A to 9C, only differs from the example cutting tool assembly 410 shown in FIGS. 8A to 8C, in that clamp 584 further comprises a non-clamping guard portion 585 configured to restrict passage of chips (not shown) through the clamping hole 26 of the cutting insert 14.

The guard portion 585 can be in the form of a semi-circle or portion of a circle. The guard portion 585 can extend in a direction away from the clamp's head portion 584D. However, such shape can be any shape which corresponds to a shape of a clamping hole of a cutting insert to be clamped. The guard portion 585 can also be configured to be slightly smaller than an associated clamping hole, leaving an insert gap 587. Such gap may facilitate mounting, removal, indexing of an associated cutting insert.

Notably, the guard portion 585 is shaped to be thinner than the cutting edges 518, to avoid reducing cutting depth thereof. Stated differently, the guard portion 585 can have a plate-shape and can be configured to be disposed within a cutting insert clamping hole 26 such that it does not protrude outwardly therefrom.

It is understood that different size and shape chips may be produced under different cutting conditions. Accordingly, in some applications it may be advantageous to have a guard portion 585 for preventing chips through the clamping hole which may obstruct cutting, and under other conditions it may be advantageous for a clamp to be devoid of a guard portion to facilitate chip flow through the guard portion.

The description above includes exemplary embodiments and details for enablement, if needed, of claimed subject matter, and does not exclude non-exemplified embodiments and details from the claim scope of the present application.

What is claimed is:

1. An indexable cutting insert (14) comprising parallel insert first and second sides (22A, 22B) connected by an insert peripheral surface (24) which extends peripherally around the cutting insert (14),
   the insert peripheral surface (24) comprising cutting edges (18) which are spaced-apart and extend from the insert first side (22A) to the insert second side (22B),
   a width direction ($D_W$) is perpendicular to the insert first and second sides (22A, 22B),
   wherein at least the insert first side surface (22A) further comprises at least one side seating surface (32) being outwardly-spaced in the width direction ($D_W$) more than the remainder of the associated insert side (22A, 22B), though not extending past the cutting edges in the width direction ($D_W$);
   wherein each of the cutting edges (18) is wider along the width direction ($D_W$) than any other portion of the cutting insert (14).

2. The cutting insert (14) according to claim 1, wherein the at least one side seating surface (32) is a plurality of side seating surfaces (32A, 32B, 32C, 32D, 32E).

3. The cutting insert (14) according to claim 1, wherein at least one clamping hole (26) opens out to one or both of the insert first and second sides (22A, 22B).

4. The cutting insert (14) according to claim 3, wherein the cutting edges (18) are arranged such that each three consecutively positioned cutting edges (18A, 18B, 18C) constitute an associated cutting arrangement comprising a central cutting edge (18A) disposed between two peripheral cutting edges (18B, 18C), the central cutting edge (18A) being wider, along the width direction ($D_W$), than any other portion of an associated insert cutting region (CU) defined from the central cutting edge (18A) to at least an imaginary straight line ($I_{L1}$) connecting the two peripheral cutting edges (18B, 18C); and
   at least a clamping hole portion (48) of the at least one clamping hole (26) is located in an associated insert clamping region (CL) which is defined outside of the associated cutting region (CU).

5. The cutting insert (14) according to claim 4, wherein the at least one side seating surface (32) is a plurality of side seating surfaces (32A, 32B, 32C, 32D, 32E) and at least three of the side seating surfaces (32D1, 32D2, 32A2) are located in the clamping region (CL).

6. The cutting insert (14) according to claim 5, wherein the at least three side seating surfaces (32D1, 32D2, 32A2) located in the clamping region (CL) are in a triangular arrangement.

7. The cutting insert (14) according to claim 4, wherein the at least one side seating surface (32) is a plurality of side seating surfaces (32A, 32B, 32C, 32D, 32E) located both in the clamping region (CL) and in the cutting region (CU).

8. The cutting insert (14) according to claim 4, wherein the at least one clamping hole (26) has portions located on each side of the imaginary line ($I_{L1}$).

9. The cutting insert (14) according to claim 8, wherein the at least one clamping hole (26) is a single through-hole which opens out to both of the insert first and second sides (22A, 22B).

10. The cutting insert (14) according to claim 9, wherein the insert cutting region (CU) is defined from the central cutting edge (18A) to at least an arc ($I_A$) having a circular curvature with the same radius as an imaginary circle ($I_C$) along which the cutting edges (18) lie, the arc ($I_A$) extending to reinforced portions (33) or points directly adjacent to the peripheral cutting edges (18B, 18C);
    the clamping hole portion (48) is defined between a clamping hole edge (50) and the arc ($I_A$), and has a crescent shaped clamping area (52) of at least 2% of an area of the imaginary circumscribed circle ($I_C$).

11. The cutting insert (14) according to claim 10, wherein the clamping area (52) is greater than 4% of the area of an imaginary circumscribed circle ($I_C$).

12. The cutting insert (14) according to claim 1, wherein each side seating surface (32) is elongated and/or curved.

13. The cutting insert (14) according to claim 1, wherein the cutting insert (14) comprises exactly five cutting edges (18A, 18B, 18C, 18D, 18E).

14. The cutting insert (14) according to claim 13, wherein the cutting insert comprises
    a disc-shaped body portion (28), and
    cutting portions (18), each of the cutting portions (18) extending from a periphery of the body portion (28) and comprising one of the cutting edges (18).

15. The cutting insert (14) according to claim 1, wherein, in a plan view of one of the insert first and second sides (22A, 22B), the cutting insert (14) has rotational symmetry for a degree of rotation fulfilling the condition: (360°/[total number of the cutting edges]).

16. The cutting insert (14) according to claim 1, wherein the cutting insert is symmetrical about an imaginary insert plane ($P_I$) which bisects the peripheral surface (24) and is parallel to the insert first and second sides (22A, 22B).

17. The cutting insert (14) according to claim 1, wherein each cutting edge (18) has an associated rake surface (36); and all of the rake surfaces face in the same circumferential direction.

18. The cutting insert (14) according to claim 1, wherein a pair of sidewalls (38) taper inwardly on either side of an associated cutting edge (18).

19. The cutting insert (14) according to claim 1, in combination with a clamping mechanism comprising a clamp and a biasing member, wherein:
    the cutting insert has at least one clamping hole which opens out to both of the insert first and second sides; and
    the clamp has a head portion configured to engage the insert's clamping hole, and a bore configured to receive at least a portion of the biasing member.

20. An indexable cutting insert (14) comprising parallel insert first and second sides (22A, 22B) connected by an insert peripheral surface (24) which extends peripherally around the cutting insert (14),
    the insert peripheral surface (24) comprising cutting edges (18) which are spaced-apart and extend from the insert first side (22A) to the insert second side (22B),
    a width direction ($D_W$) is perpendicular to the insert first and second sides (22A, 22B),
    wherein at least the insert first side surface (22A) further comprises at least one side seating surface (32) being outwardly-spaced in the width direction ($D_W$) more than the remainder of the associated insert side (22A, 22B), though not extending past the cutting edges in the width direction ($D_W$); and wherein:
    at least one clamping hole (26) opens out to one or both of the insert first and second sides (22A, 22B);
    the cutting edges (18) are arranged such that each three consecutively positioned cutting edges (18A, 18B, 18C) constitute an associated cutting arrangement comprising a central cutting edge (18A) disposed between two peripheral cutting edges (18B, 18C), the central cutting edge (18A) being wider, along the width direction ($D_W$), than any other portion of an associated insert cutting region (CU) defined from the central cutting edge (18A) to at least an imaginary straight line ($I_{L1}$) connecting the two peripheral cutting edges (18B, 18C); and at least a clamping hole portion (48) of the at least one clamping hole (26) is located in an associated insert clamping region (CL) which is defined outside of the associated cutting region (CU).

21. An indexable cutting insert (14) comprising parallel insert first and second sides (22A, 22B) connected by an insert peripheral surface (24) which extends peripherally around the cutting insert (14), the insert peripheral surface (24) comprising cutting edges (18) which are spaced-apart and extend from the insert first side (22A) to the insert second side (22B), a width direction ($D_W$) is perpendicular to the insert first and second sides (22A, 22B), wherein at least the insert first side surface (22A) further comprises at least one side seating surface (32) being outwardly-spaced in the width direction ($D_W$) more than the remainder of the associated insert side (22A, 22B), though not extending past the cutting edges in the width direction ($D_W$); and wherein a pair of sidewalls (38) taper inwardly on either side of an associated cutting edge (18).

* * * * *